UNITED STATES PATENT OFFICE 2,332,823

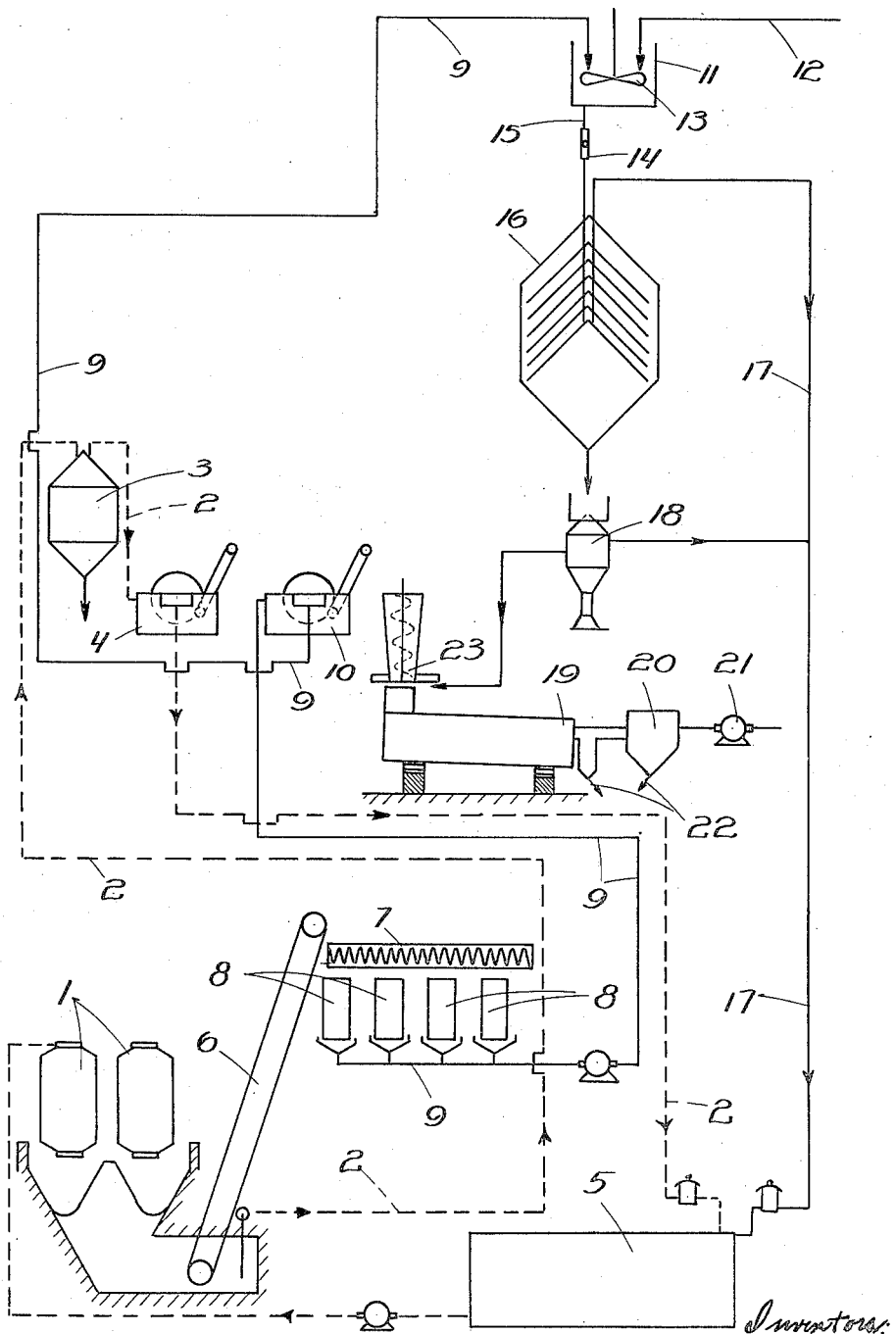

EXTRACTION OF SUGAR PROCESS WATER

Teodor Wintzell, Malmo, and Nils Tore Lauritz Lauritzson, Trelleborg, Sweden

Application April 15, 1942, Serial No. 439,136
In Sweden December 14, 1940

8 Claims. (Cl. 127—43)

In beet-sugar factories using the diffusion process for extracting the sugar from the sliced beets many attempts have been made for recovering the waste water of the diffusion process for re-use as pressure water in this process, but up to now such recovery has been found practicable only in the form of a so called partial recovery, which implies that only one sort of waste water, viz., the so called diffusion waste water, but not the other sort, the so called press water, after clarifying in a Babrowski filter or other pulp filter is returned for re-use as pressure water in the diffusion battery. Exhaustive researches have shown that at least in certain cases the diffusion waste water, but not the press water which is obtained by pressing the extracted slices discharged from the diffusers to the desired content of dry substance, can be returned for re-use as pressure water in the diffusion process without deteriorating the juice quality. The diffusion waste water amounts to about 100% of the beet weight, or in the case of a beet input of 2000 metric tons a day to about 1400 liters a minute. The quantity and composition of the press water depend on the degree of pressing, and the following approximate figures may be stated for a factory having a beet input of about 2000 metric tons a day:

| Pressing to a dry substance content of— | Quantity of press water | |
|---|---|---|
| | Relative to the beet weight | Liters/min. |
| | *Percent* | |
| 10% | 50 | 700 |
| 15% | 63 | 900 |
| 20% | 75 | 1,050 |

When pressing the pulp to a dry substance content of 10% the press water after filtering through a Babrowski filter, contains about 1.1% dry substance, a substantial portion of which consists of albumins. When pressing to a higher dry substance content in the pulp the dry substance content of the press water increases slightly, mainly due to an increase of the sugar content of the water.

According to the present invention, it has been found possible, preferably after separating sand and filtering off pulp, to purify the press water to a sufficient degree to make possible the returning thereof into the diffusion process without deteriorating the quality of the juice. The invention substantially consists in separating albuminous substance as a flocculent precipitate by adding a strong acid, e. g. sulphuric acid, to an optimum of about pH=3.6 and separating the precipitated substance by decanting and centrifugal separation or possibly by filtering with the use of a suitable filter medium. As an agent of flocculent precipitation only a strong acid, such as sulphuric acid, hydrochloric acid etc., can be used for obtaining the necessary reduction of pH in the strongly buffered waste waters. The same effect cannot be obtained with carbonic acid, sulphurous acid etc., and therefore a process of flocculent precipitation based on these acids is in no respect comparable with the present method. With a dry substance content of about 1.1% the press water contains about 0.3% albuminous substance which is capable of flocculent precipitation by the addition of a strong acid, said substance, when extracted according to the method of the present invention, forming a valuable by-product in the manufacture of beet-sugar. The method can be applied not only to the press water but if necessary or desirable also to the diffusion waste water or part thereof. The albuminous substance extracted by decanting or in any other way may be used as a raw material for the manufacture of yeast, foods, medicinal preparations etc., and especially it may be used as cattle food either alone or mixed with one or more other foods, such as molasses, beet slices (extracted or containing sugar), feeding cellulose, etc.

The invention will be more particularly described with reference to the accompanying drawing which illustrates a diagram of a form of the method and an example of the apparatus for carrying out the method.

The water discharged when emptying the diffusers 1 (diffusion waste water) is returned for re-use in the diffusion process by leading it, as indicated by the broken line 2, via a sand separator 3 and a pulp filter 4 to a pressure water reservoir 5 from which pressure water for the diffuser battery is taken. The wet pulp discharged from the diffusers is conveyed for example by an elevator 6 and a screw conveyor 7, to pulp presses 8 where water is pressed off in pressing the pulp to the desired dry substance content. The water pressed off, called the press water, is led, as indicated by the line 9, via a pulp filter 10 to a vessel 11 having an acid supply conduit 12 and preferably provided with an agitator 13. In the vessel 11 a strong acid, such as sulphuric acid, is added to the press water and mixed therewith. The addition of acid should be strictly controlled, e. g., by dosing the acid according to impulses from a water-meter 14 connected for example in a conduit 15 for the water from the acid admixing vessel 11 to a decanting apparatus 16. In this decanting apparatus which should be properly designed for its purpose, for example provided with laminae of properly determined inclination, such as 45°, the flocculent precipitate obtained by the addition of acid is concentrated, so that from the bottom of the decanting apparatus is withdrawn a concentrate amounting for example to 10% of the original liquid volume. The clarified water which leaves the decanting apparatus is now of such quality that it can be entered as pressure water into the battery without disadvantage, as is indicated in the drawing by a conduit 17 through which the clarified water is introduced into the pressure water reservoir 5.

This clarified press water, which is thus returned for re-use as pressure water in the battery, has higher sugar content and a lower pH value than the pressure water which has hitherto been supplied to the battery. The lower pH value of the pressure water has proved to be extremely valuable. It results in improved ensilage storing qualities of the beet pulp which is discharged from the diffusers and then pressed as above described, in that the pH level desirable for good ensilage storing of said pulp (about pH=4.0) is obtained easily and rapidly, so that the addition of a special ensilage liquid such as hydrochloric acid, molasses or the like to said pulp probably can be dispensed with in most cases in which such an addition otherwise would be necessary or desirable. As shown in the diagram the concentrate from the decanting apparatus 16 is led to centrifugal separators 18 for further concentration, where flocculent precipitated substance is extracted with a dry substance content of about 25%. The water flowing off at the centrifugation is, similarly as the clarified water from the decanting apparatus 16, led to the reservoir 5 for the pressure water for the battery. The substance obtained contains about 35% raw protein, calculated on the dry substance. For the purpose of using it as cattle food the substance is dried either alone or mixed with other foods, e. g., beet pulp, feeding cellulose, molasses. According to the diagram the drying takes place in a drier drum 19 heated by flue-gases, to which are connected a cyclone 20 and a fan 21 for drawing off the gases. Packing of the dried material into bags can take place at 22. If the substance is dried mixed with beet pulp, this is supplied to the drier drum through a screw press 23 which then fulfils a similar purpose as the previously mentioned presses 8. The drying of the material can naturally be carried out also in some other suitable way than that indicated above.

The most essential feature of the invention consists in the clarifying of the waste waters for re-use in the diffusing process while simultaneously extracting albuminous by-products valuable as cattle food or as raw materials for the manufacture of special food substrata by flocculent precipitation of these by the addition of an acid, preferably sulphuric acid, or possibly some other strong mineral acid, and separating off the precipitated substance. This separation can be carried out, besides in the manner suggested above, alternatively by adding a suitable filter medium, for example sand, infusorial earth or a suitable organic material, for example feeding cellulose, to the acid admixing vessel 11 before the decanting apparatus 16, whereupon the concentrate from the decanting apparatus 16 can be filtered through filter presses or filters of any other suitable type. The filtered-off substance obtained can, after drying, be relieved of such heavy constituents as may be unfavourable to the composition of the food by dry separation. It is also possible, after the addition of the acid and a filter medium, to filter the liquid direct in the manner just mentioned without preceding concentration of the flocculent precipitate in a decanting apparatus.

As will be understood from the preceding description, the process according to the invention has several important advantages. These may be briefly summed up as follows:

1. The waste water problem so important in the manufacture of beet-sugar may be considered solved, because no waste water from the diffusion process need to be carried off by sewers or the like, as both the diffusion waste water and the press water can be returned for re-use in this process without causing any difficulty or disadvantage as regards the juice extraction, and also without impairing the quality of the juice in any respect.

2. By the returning of both the diffusion waste water and the press water the requirements of water in the factory are reduced by about 150 to 175% of the beet weight.

3. The extracted slices (beet pulp) get a pH level favourable for storing, and besides the higher sugar content of the pulp favourably influences the fermentation process in the case of ensilage.

4. The largely albuminous colloids present in the press water (and possibly in the diffusion waste water) are obtained as a valuable by-product capable of being used either as a cattle food alone or mixed with other foodstuffs or as a raw material for the manufacture of food preparations etc.

5. The dry substance which previously has been lost with the waste waters is recovered to 100%, namely partly in the form of an increased yield of pressed beet pulp, partly in the form of the concentrate separated from the press water. Thereby the yield of by-products is substantially increased, namely for example from 5% to 6% when calculated as dry substance on the beet weight. This increase is the more important as it is gained by retaining particularly valuable substances which otherwise are carried off by sewers and then many times are causing troubles in sanitary or other respect.

What we claim and desire to secure by Letters Patent is:

1. The method of treating the waste waters of the diffusion process in beet-sugar factories, which comprises precipitating in flocculent form colloids contained in said waste waters by adding a strong mineral acid to the latter until the pH optimal for the precipitation of the colloids in flocculent form is attained, separating off the flocculent precipitate, and returning the clarified waste waters for re-use in the diffusion process.

2. The method of treating the waste waters of the diffusion process in beet-sugar factories, which comprises precipitating in flocculent form the colloids contained in said waste waters by adding a strong mineral acid to a pH value of about 3.6, separating off the flocculent precipitate, and returning the clarified waste waters for re-use in the diffusion process.

3. The method of treating the press water of the diffusion process in beet-sugar factories, that is the water pressed off from the beet pulp discharged from the diffusers, which consists in filtering off remaining pulp from said press water, precipitating in flocculent form colloids contained in said water by adding a strong mineral acid to a pH value of about 3.6, separating off the flocculent precipitate, and returning the clarified water for re-use in the diffusion process.

4. The method of treating the waste waters of the diffusion process in beet-sugar factories, which comprises precipitating in flocculent form the colloids contained in said waters by adding sulphuric acid to a pH value of about 3.6, separating off the flocculent precipitate, and returning the clarified waste water for re-use in the diffusion process.

5. The method of treating the waste waters of the diffusion process in beet-sugar factories, which comprises precipitating in flocculent form the colloids contained in said waters by adding a strong mineral acid to a pH value of about 3.6, concentrating the flocculent precipitate by decanting and further concentrating the concentrate by centrifugal separation, drying the concentrate, and returning the clarified water to a reservoir for pressure water for use in the diffusion process.

6. The method of treating the waste waters of the diffusion process in beet-sugar factories, which comprises precipitating in flocculent form the colloids contained in said waters by adding a strong mineral acid to a pH value of about 3.6, adding a filter aid to the waste water, filtering the water to separate off the flocculent precipitate, and returning the clarified water for re-use in the diffusion process.

7. The method of treating the waste waters of the diffusion process in beet-sugar factories, which comprises precipitating in flocculent form the colloids contained in said waters by adding a strong mineral acid to a pH value of about 3.6, adding a filter aid to the waste water, concentrating the flocculent precipitate by decanting, filtering the concentrate, and returning the clarified water for re-use in the diffusion process.

8. The method of treating the waste waters of the diffusion process in beet-sugar factories, which comprises precipitating in flocculent form the colloids contained in said waters by adding a strong mineral acid to a pH value of about 3.6, adding a filter aid to the waste water, filtering the water in filter means to separate off the flocculent precipitate, drying the filtered-off substance, relieving said substance of heavy constituents by dry separation, and returning the clarified water for re-use in the diffusion process.

TEODOR WINTZELL.
NILS TORE LAURITZ LAURITZSON.